US007027647B2

(12) United States Patent
Mukherjee et al.

(10) Patent No.: US 7,027,647 B2
(45) **Date of Patent: *Apr. 11, 2006**

(54) CODER MATCHED LAYER SEPARATION FOR COMPRESSION OF COMPOUND DOCUMENTS

(75) Inventors: Debargha Mukherjee, San Jose, CA (US); Nasir Memon, Holmdel, NJ (US); Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 101 days.

This patent is subject to a terminal disclaimer.

(21) Appl. No.: 10/036,979

(22) Filed: Dec. 31, 2001

(65) Prior Publication Data

US 2003/0123729 A1 Jul. 3, 2003

(51) Int. Cl.
*G06K 9/34* (2006.01)

(52) U.S. Cl. ....................................... 382/173; 382/283

(58) Field of Classification Search ................ 382/173, 382/176, 232, 243, 282, 283
See application file for complete search history.

(56) References Cited

U.S. PATENT DOCUMENTS 5,778,092 A 7/1998 MacLeod et al.
5,900,953 A * 5/1999 Bottou et al. ............... 382/176
6,324,305 B1 * 11/2001 Holladay et al. ........... 382/176
6,334,001 B1 * 12/2001 de Queiroz et al. ........ 382/233
6,373,981 B1 * 4/2002 de Queiroz et al. ........ 382/232
2001/0000711 A1 5/2001 Queiroz et al.

FOREIGN PATENT DOCUMENTS

EP 0491556 6/1992
EP 0886242 12/1998
EP 1006715 6/2000

OTHER PUBLICATIONS de Queiroz. "On data filling algorithms for MRC layers". Image Processing, 2000. Processing. 2000 International Conference on, Sep., 2000, pp.: 586-589, vol. 2.*

Debargha Mukherjee et al: "JPEG-Matched MRC Compression of Documents" Proceedings 2001 International Conference on Image Processing. ICIP 2001 Thessaloniki, Greece, Oct. 7-10, 2001. International Conference on Image Processing, NY NY; IEEE, US col. 3 Conf.8 pp.: 434-437 XP001110169.

Queiroz De R L et al: " Optimizing Block-Thresholding Segmentation for Multilayer Compression of Compound Images" IEEE Transactions on Image Proceessin, IEEE Inc. NY, US vol. 9 No. 9 Sep. 2000 pp. 1461-1471 XP000963520.

* cited by examiner

*Primary Examiner*—Jingge Wu
*Assistant Examiner*—Colin LaRose

(57) ABSTRACT

Methods for decomposing compound documents for mixed raster content representation are provided. A method for decomposing an image includes the step of decomposing the image into a plurality of stripes. Each stripe is decomposed into foreground, background, and mask layers. The layers are interpolated to modify values of irrelevant pixels in order to achieve more efficient compression. The layers may subsequently be compressed with a coder.

18 Claims, 13 Drawing Sheets

CODER MATCHED LAYER SEPARATION FOR COMPRESSION OF COMPOUND DOCUMENTS

FIELD OF THE INVENTION

This invention relates to the field of data compression. In particular, this invention is drawn to representation and compression of compound documents.

BACKGROUND OF THE INVENTION

Compound documents may include color images, text, and graphics. Mixed raster content (MRC) is an International Telecommunication Union standard (ITU T.44 04/1999) that specifies a method for efficient representation of a compound document as a union of multiple layers. MRC also specifies methods for compressing the document using pre-determined encoders for the individual layers.

Although the ITU T.44 standard sets forth methods for efficient representation of the document once the layers are identified, the standard does not address decomposition of an MRC document into the individual layers. The decomposition approach, however, may have a significant influence on the compressibility of the resulting layers and thus the size of the compressed document. Thus although numerous distinct decompositions of the document may exist, they will not all yield the same level of compression. Trying each decomposition to identify the one with the optimal rate and quality is intractable.

SUMMARY OF THE INVENTION

In view of limitations of known systems and methods, methods and apparatus for decomposing compound documents for mixed raster content representation and compression are provided.

A method for decomposing an image includes the step of decomposing the image into a plurality of stripes. Each stripe is decomposed into foreground, background, and mask layers. The layers are interpolated to modify values of irrelevant pixels in order to achieve more efficient compression. The layers may subsequently be compressed with the coder.

In one embodiment, a perimeter finding function is used with a common area reduction function to identify a base color for each layer and offsets to common reduced areas thus effectively separating the stripe into foreground and background layers for all regions except where the foreground and background common reduced areas overlap. A coder matched layer separation process is applied to the overlapped common reduced area to separate it into the foreground and background layers before interpolation.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
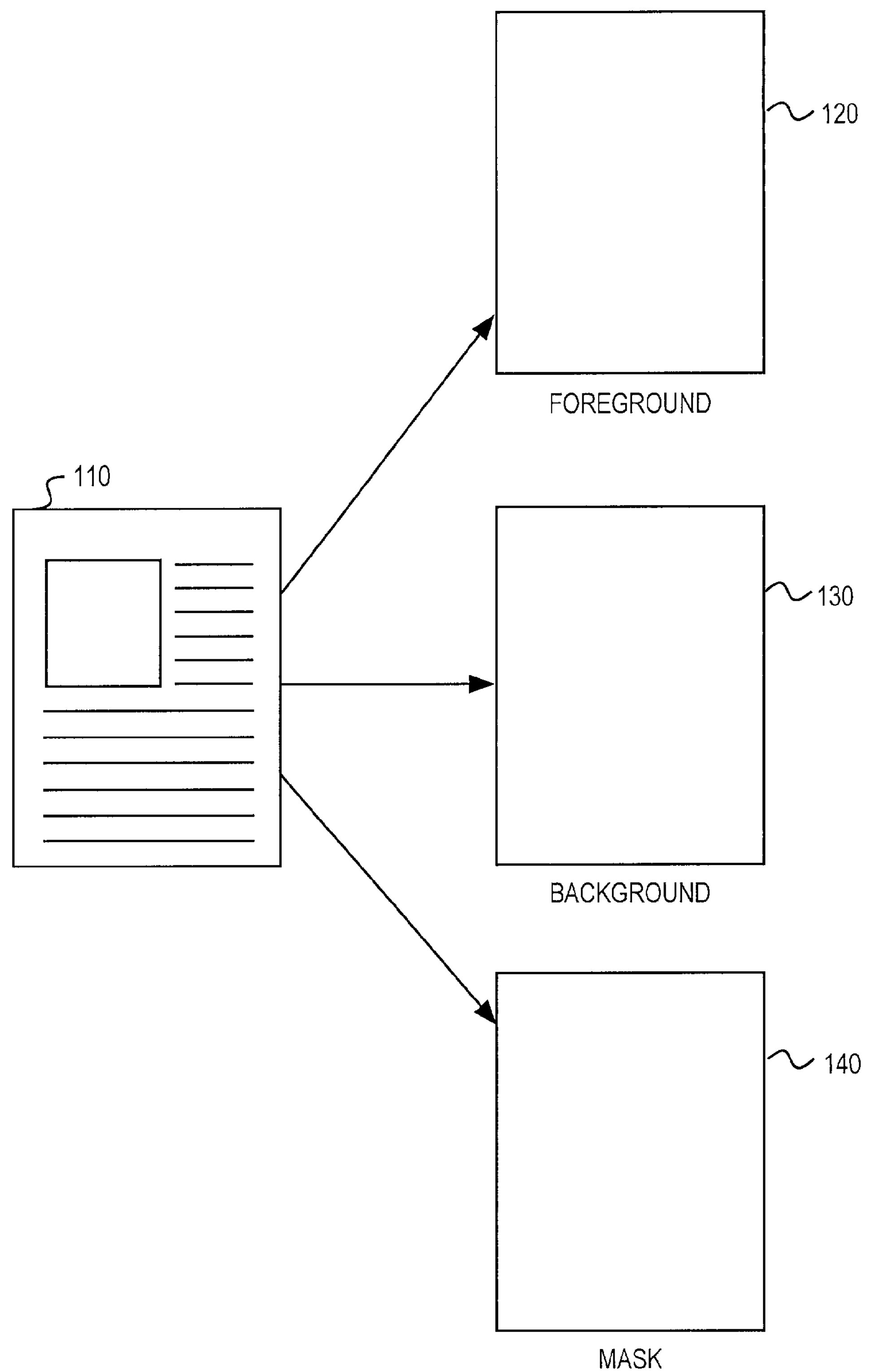
FIG. 1 illustrates a multilayer representation of a compound document.

In one embodiment MRC represents a compound document 110 using three layers (background 130, foreground 120, and mask 140) as illustrated in FIG. 1. The background and foreground are image layers and the mask layer is binary (i.e., 1 bit per pixel). Once represented as layers, the document may be compressed. The background and foreground layers may be encoded at a lower resolution than the original, but the mask is always coded in a lossless manner at full resolution. The three layer model may be extended to N layers by adding layers in (image, mask) pairs.

To reconstruct the original document, the background and foreground layers are reconstructed from their corresponding compressed layer data. The mask identifies whether a pixel of the reconstructed document is to be provided by the reconstructed background or the reconstructed foreground layers.

The standard supports the use of JPEG (Joint Photographic Experts Group) or JBIG (Joint Bilevel Image Experts Group) compression for the foreground and background image layers. The standard supports Group 3 (G3), Group 4 (G4), and JBIG compression for the mask layer.

Figure 2:
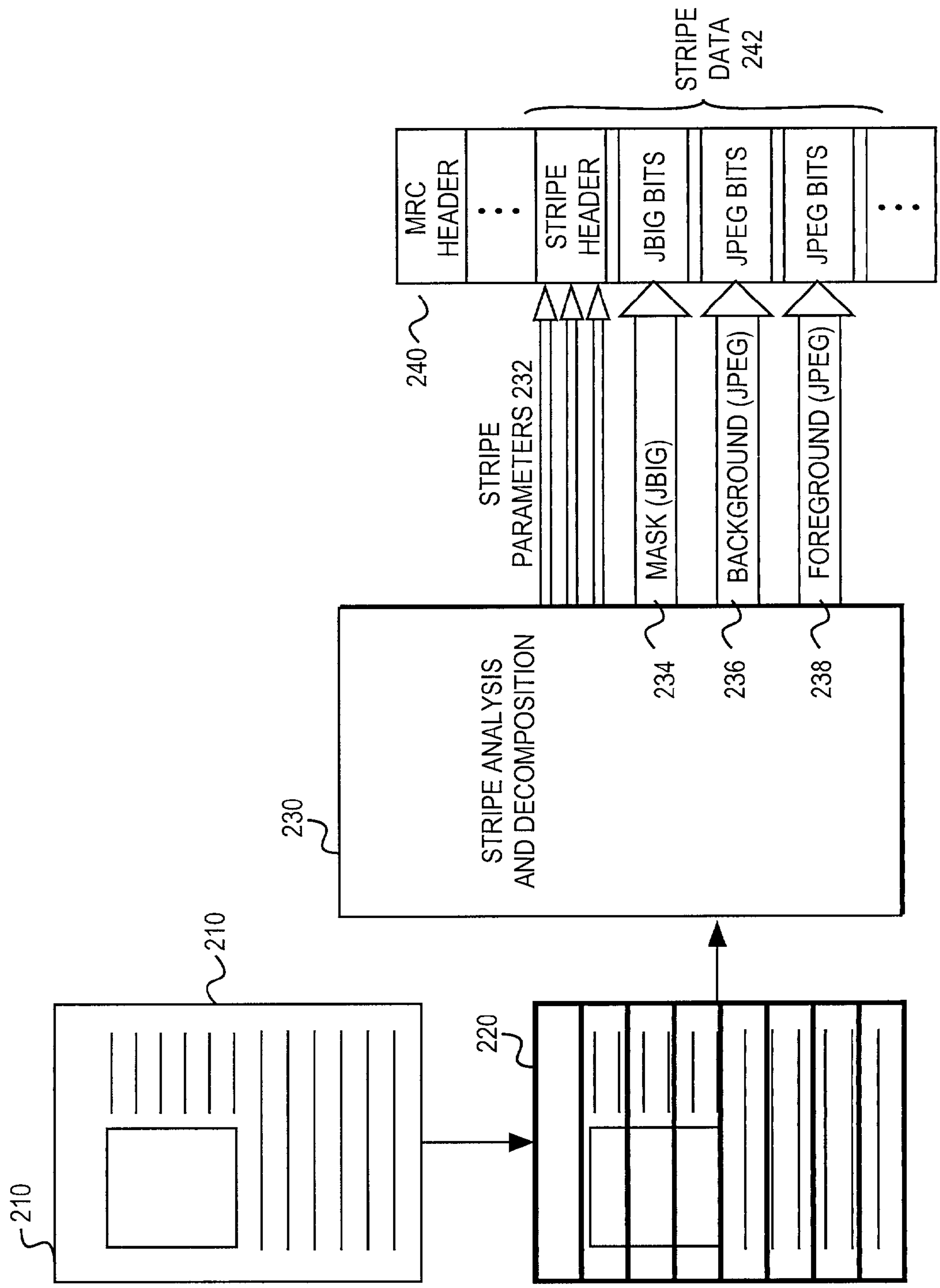
FIG. 2 illustrates stripe decomposition of the compound document.

MRC supports coding the document as a series of stripes. FIG. 2 illustrates stripe decomposition of a compound document 210. The document is striped for analysis. The stripes of the striped document 220 are analyzed and decomposed in block 230. The background 236, foreground 238, and mask 234 data for each stripe as well as stripe parameters 232 are encapsulated in the MRC bit stream 240 as stripe data 242. The MRC standard does not address the specifics of the analysis or decomposition provided by block 230.

One goal of the decomposition process is to obtain a new optimal decomposition in terms of compactness of the coded bitstream and quality of the reconstructed image while staying within a reasonable complexity constraint. Optimization of the coded bitstream requires consideration of the characteristics of the encoders applied to the individual layer data. In the illustrated embodiment, block 230 uses JPEG to encode the foreground and background layers and thus must consider the particulars of the JPEG coder when determining how stripes should be decomposed into the individual layers for compression.

The MRC syntax permits a set of parameters to be transmitted for each stripe. These parameters include spatial offsets and sizes to define the size and position of the coded foreground and background layers. The foreground and background layers may be smaller than the stripe. The mask layer, however, is always full resolution and full size.

Figure 3:
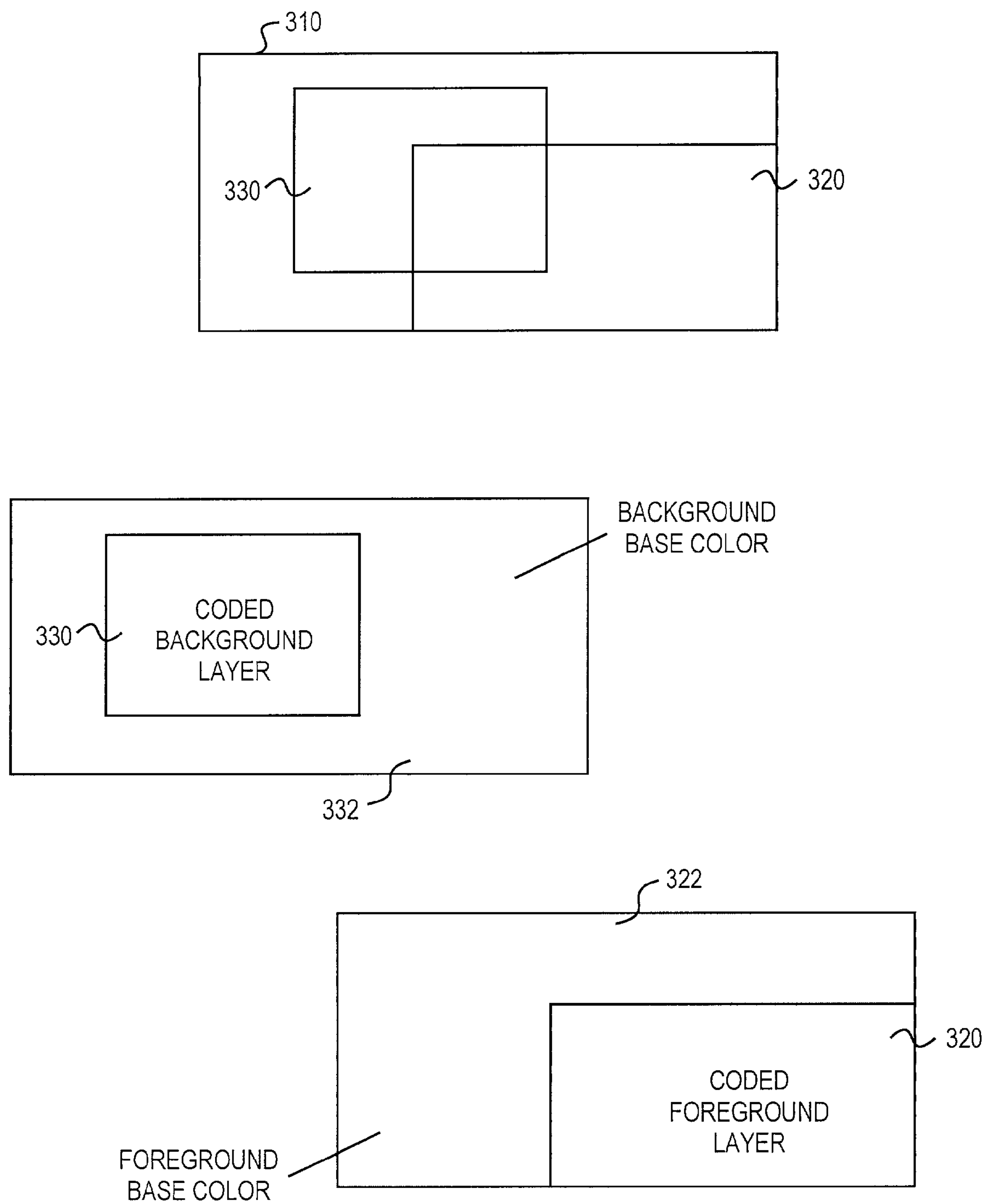
FIG. 3 illustrates coded foreground and background layers of a stripe.

FIG. 3 illustrates a stripe 310 having coded foreground 320 and background 330 layers that are smaller than the stripe. Two parameters represent the foreground and background base color that are used to fill up the foreground and background layers in portions 322 and 332, respectively, outside the coded regions specified by the offset and size parameters.

Once the mask is derived, both the foreground and background layers have "holes" or "don't care pixels" corresponding to pixels that belong to the other layer as determined by the mask. Thus whenever the mask indicates that a particular pixel is sourced from the foreground layer, there is a corresponding hole at the same location in the background layer. Such holes or don't care pixels are irrelevant to the reconstruction, but can have a significant affect on compression depending upon their values. Given that the values are irrelevant to reconstruction, they may be modified to achieve more efficient compression.

Block 230 must analyze a stripe to determine the following information: 1) offsets and sizes of coded foreground and background layers, 2) foreground and background base colors, 3) full resolution mask, 4) interpolation values for the don't care pixels in the foreground and background layers (i.e., JPEG matched interpolation), 5) JPEG parameters for the foreground and background layers, and 6) JBIG parameters for the mask layer.

Figure 4:
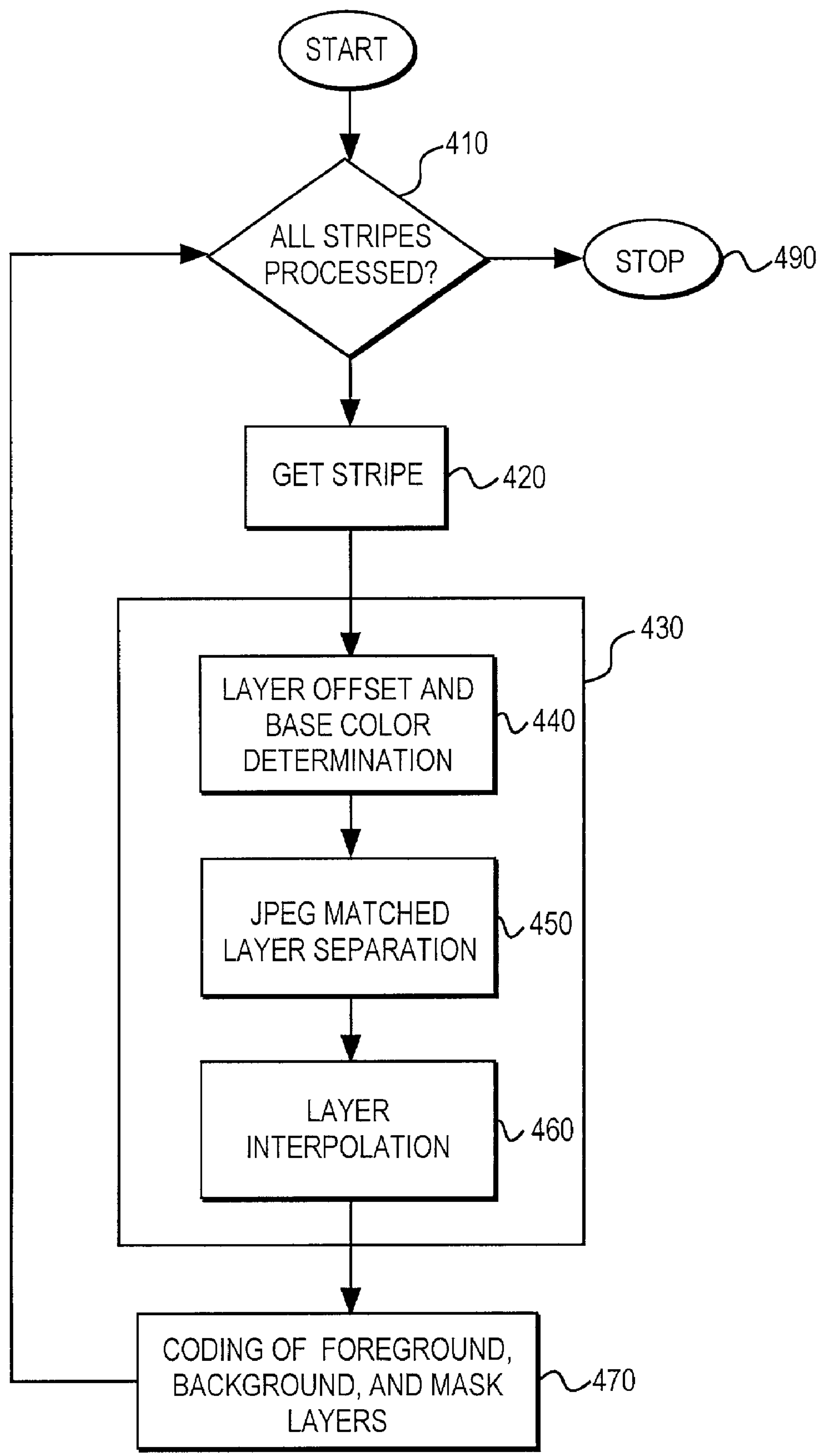
FIG. 4 illustrates one embodiment of an MRC coder process including the stripe analysis process.

FIG. 4 illustrates one embodiment of an MRC coder process including the stripe analysis process. The MRC coder process is operating on stripes of the striped compound document. Step 410 determines whether there are any more stripes to process. If not, then the process is complete in step 490. Otherwise step 420 obtains a stripe for analysis. The stripe analysis portion 430 may be conceptually subdivided into three components. In step 440, the layer offsets, sizes, and base colors are determined. Step 450 performs a coder matched layer separation. In the illustrated embodiment, this is a JPEG matched layer separation. Step 460 then interpolates the irrelevant don't care pixels to facilitate JPEG compression. The image (foreground and background) layers are JPEG coded and the mask layer is JBIG coded in step 470. The process continues until all stripes have been processed.

The goal of the first step of the stripe analysis process is to reduce the coded size of the image layers through appropriate selection of base colors and layer sizes and offsets. If a compound document has margins of constant colors, for example, such information can be more economically conveyed through the use of offset and base color parameters as opposed to JPEG encoding. The first step can be further subdivided into the functions of perimeter finding and common area reduction. The functions may be performed substantially simultaneously.

The perimeter finding function attempts to find the thickest margins along the edges of a strip that consists of only two colors so that the residual coded region in the image layers are minimized. A systematic analysis of stripe rows and columns is performed for this function.

Figure 5:
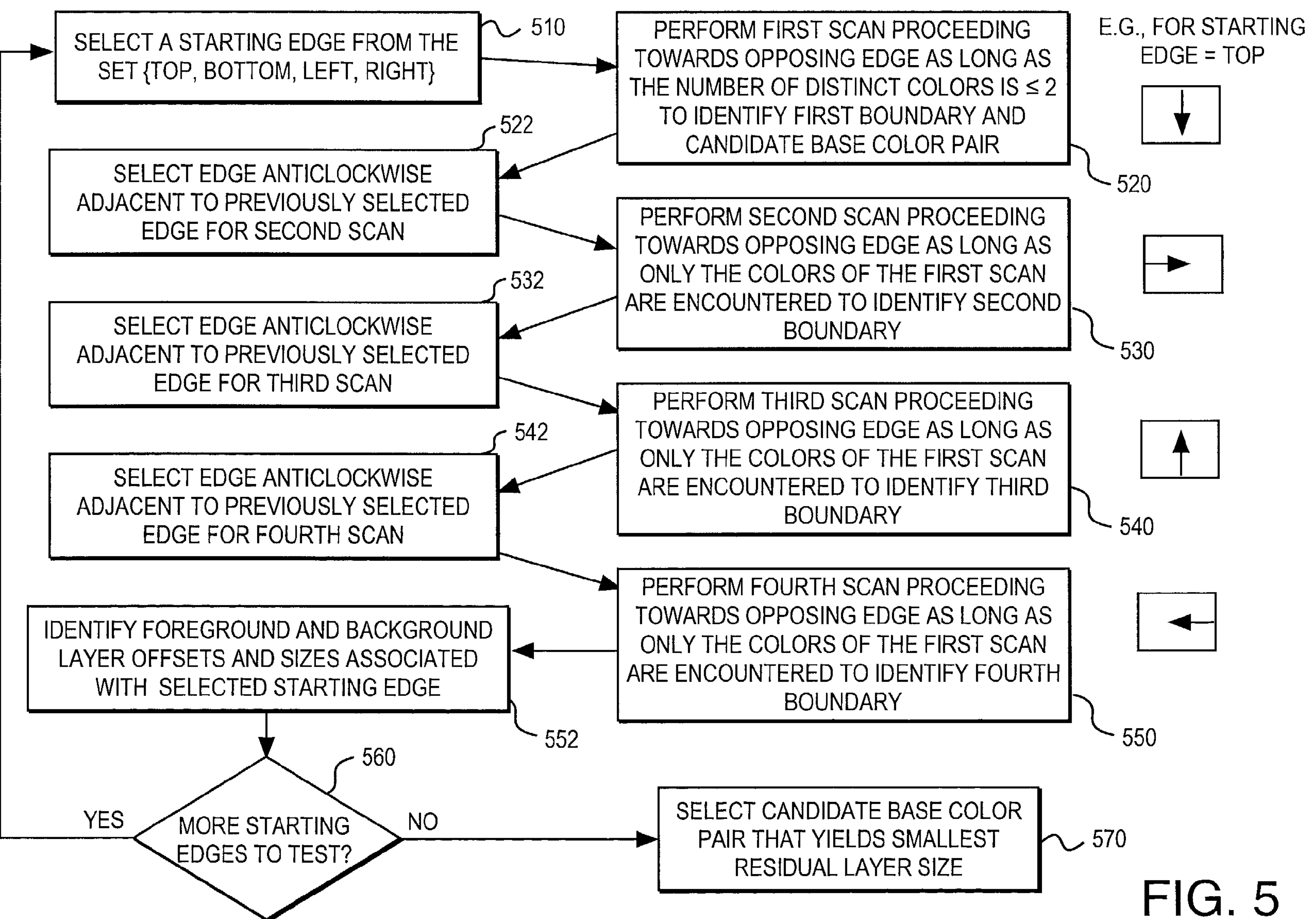
FIG. 5 illustrates the perimeter finding function.

FIG. 5 illustrates the perimeter finding function. Step 510 selects an edge to start with given the set {top, bottom, left, right}. All four will eventually be processed so any edge may be selected initially. For purposes of example, the top edge is presumed the initial selected edge.

A scan is performed on the stripe beginning with the selected edge and proceeding to the edge opposite the selected edge as indicated by step 520. The scan continues until encountering more than two distinct colors. The first two distinct colors become the candidate base color pair. If, for example, the top edge is initially selected row scans beginning at the top edge and proceeding toward the bottom edge are performed until encountering a third color. This marks the first boundary.

Proceeding anticlockwise, another edge is selected in step 522. If the top edge was initially selected, the next edge is the left edge in one embodiment. Scanning is performed beginning with the new edge and proceeding toward its opposite edge in step 530. If the left edge is selected, scanning proceeds along columns until encountering a color that is not a member of the candidate base color pair. This marks the second boundary.

Proceeding anticlockwise, a third edge is selected in step 532. If the top edge was initially selected, the third edge is the bottom edge in one embodiment. Scanning is performed beginning with the third edge and proceeding toward its opposite edge in step 540 until encountering a color that is not a member of the candidate base color pair. This marks the third boundary.

Proceeding anticlockwise, a fourth edge is selected in step 542. If the top edge was initially selected, the fourth edge is the right edge in one embodiment. Scanning is performed beginning with the fourth edge and proceeding toward its opposite edge in step 550 until encountering a color that is not a member of the candidate base color pair. This marks the fourth boundary.

Based on the boundaries obtained through scanning, foreground and background layer offsets and sizes can be determined in step 552. One of the two colors of the candidate base color pair is assigned to the foreground base color while the other member of the pair is assigned to the background base color.

The information obtained so far represents only one candidate pair of base colors and associated offsets. This solution may not be optimal. For example, a different initial scan edge may result in a different candidate base color pair and associated offsets that produce a smaller coded region. Accordingly, step 560 ensures that the process is repeated until a candidate base color pair and associated offsets are determined for each possible starting edge.

After each edge of the stripe has been a starting edge there will be four candidate base color pairs with associated offsets. Thus after all possible starting edges have been processed as determined by step 560, step 570 selects the candidate base color pair (and associated offsets) that result in the smallest coded regions.

At this point, the foreground and background layers are the same size and have the same offsets resulting in a common area for the foreground and background layers. The common area reduction function attempts to reduce the size of the coded foreground or background layer beyond the common area.

Generally, the common area is columnwise scanned from one edge towards the opposing edge. The fraction of pixels having the base color of the selected layer is tabulated for each column. This value is compared with a threshold, $T_F$ typically set to 0.75. A variable $N_F$ is a function of the document resolution. In one embodiment, $N_F$ is selected to correspond to the number of columns required for a 0.25 inches width. As soon as a contiguous run of $N_F$ columns where the fraction of pixels having the selected layer base color falls below $T_F$, the scan is stopped and the background layer is adjusted to start at the beginning of the run.

Figure 6:
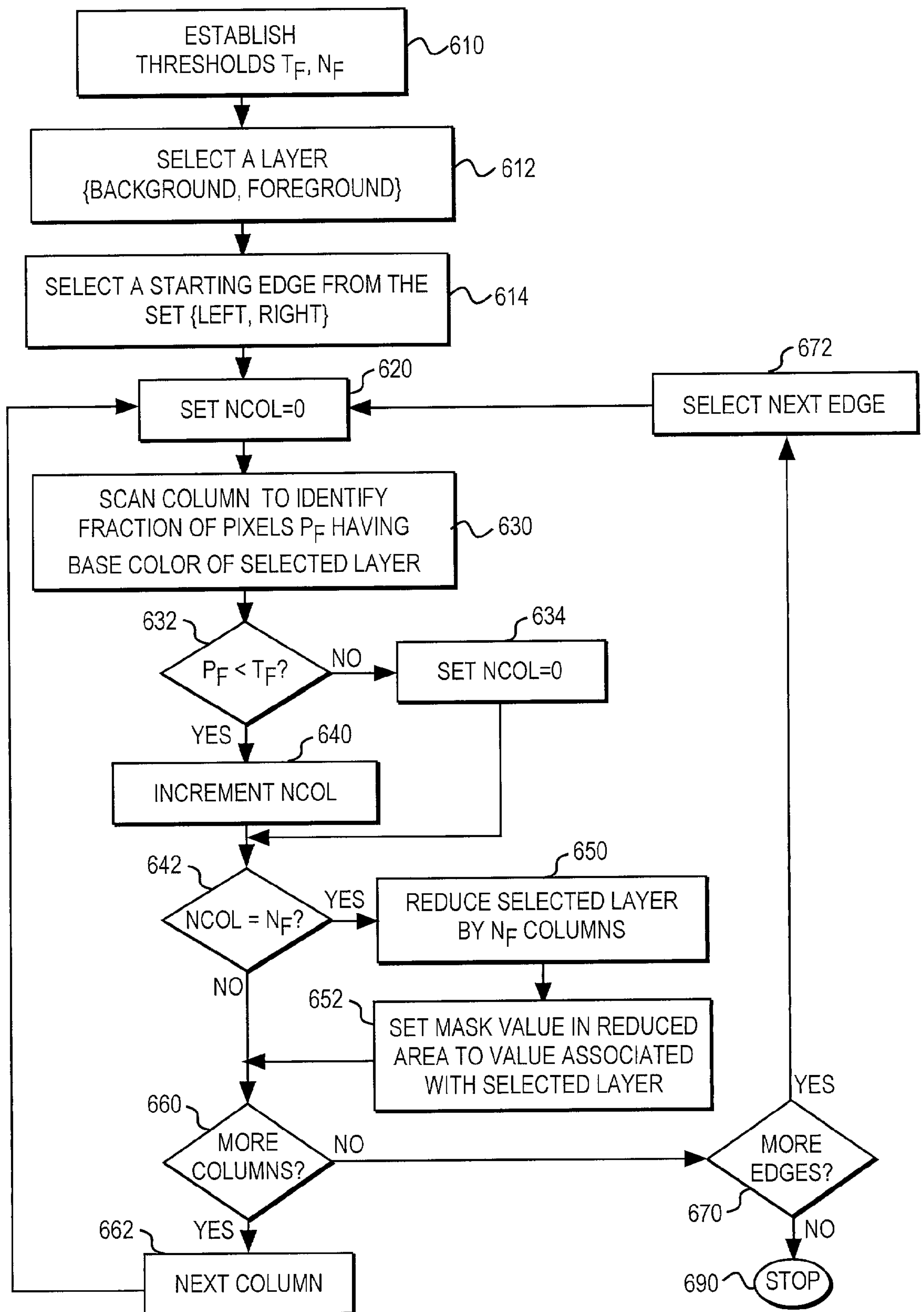
FIG. 6 illustrates one embodiment of the common area reduction function.

FIG. 6 illustrates one embodiment of the common area reduction function. In step 610, threshold variables $T_F$ and $N_F$ are initialized. $T_F$ is a pixel threshold and is set to 0.75 in one embodiment. $N_F$ represents a number of contiguous rows or columns threshold and is a function of the document resolution. In one embodiment, $N_F$ is initialized to a value corresponding to approximately 0.25 inches.

In step 612, a layer is selected for common area reduction. In one embodiment, the common area reduction function begins with the background layer. In step 614, a starting edge of the stripe is selected. In one embodiment, the starting edge is selected from one of the left and right edges.

In step 620 a number of columns variable, NCOL, is set to zero. Step 630 scans a column to identify a fraction of pixels, $P_F$, having the base color associated with the selected layer. If $P_F<T_F$ (e.g., less than 75% of the pixels are associated with the background base color), then NCOL is incremented in step 640, otherwise NCOL is set to zero in step 634. Step 642 determines whether $NCOL=N_F$ thus determining whether there are at least $N_F$ contiguous columns for which $P_F<T_F$.

If not, then step 660 checks whether there are additional columns to be processed. If so, step 662 selects the next column and the process continues with step 620 using the new column.

If so, then step 650 reduces the coded area of the selected layer by $N_F$ columns. This effectively decreases the amount of common area required for coding the selected layer. Accordingly, the mask value in the discarded portion of the common area is set to the value associated with the selected layer in step 652. For a mask convention of 0-background and 1-foreground, in the area discarded from the background layer, the mask value is assigned to 0 (background) for all pixels having the background color, and 1 otherwise. Step 660 then determines whether there are any more columns to process.

If step 660 determines that there are no more columns to process in the common area, step 670 determines if there is another starting edge to process. If not, then the process is completed in step 690. Otherwise, the next edge is selected for processing in step 672 and the process repeats from step 620 with the new edge.

Once the common area reduction of FIG. 6 has been performed for one layer (e.g., background), the process may be repeated for the other layer (e.g., foreground). The foreground and background layers, however, cannot both be reduced from the same sides. Thus if the background layer has been reduced from the left edge of the common area, the foreground cannot be reduced from the left edge. The foreground, however, may be reduced from the right edge if no reduction from the right has previously been made for the background layer. Thus scans for one or both edges of one layer can be skipped entirely. Thus it is necessary to identify the edges for which reduction for a selected layer is successful to eliminate attempting such reduction for the same edges for the next layer.

In one embodiment, the perimeter and common area reduction functions are performed substantially concurrently. Even if a first candidate base color pair yields a larger common area than a second base color pair, the first candidate base color pair may yield a smaller sum of foreground and background layer sizes after common area reduction. Performing perimeter finding and common area reduction functions concurrently enables one to see if any or both of the layers can be further reduced immediately after identifying a pair of candidate colors. Of the four possible candidate pairs, the one that yields the smallest sum of areas of the background and foreground layers is chosen.

The mask values are now assigned based on the results of the analysis. In one embodiment, the lighter (i.e., higher luminance) color of the base color pair is considered the background base color while the darker color is considered to be the foreground base color. The mask is then assigned a 0 or a 1 depending on whether the color of the pixel is the background base color or the foreground base color, respectively. Moreover, if the layers were reduced beyond the common area, the mask values are assigned accordingly (see step 652). For example, if the foreground layer has been reduced, the mask in the discarded region is assigned so that pixels with the foreground base color are assigned 1 while all other pixels are assigned 0. Thus after processing both layers, the mask values for all pixels other than those comprising the intersection of the foreground and background layers has been determined. The result is that the foreground, background, and mask values for all regions of the stripe except the portion represented by overlapped common reduced areas have been determined.

Figure 7:
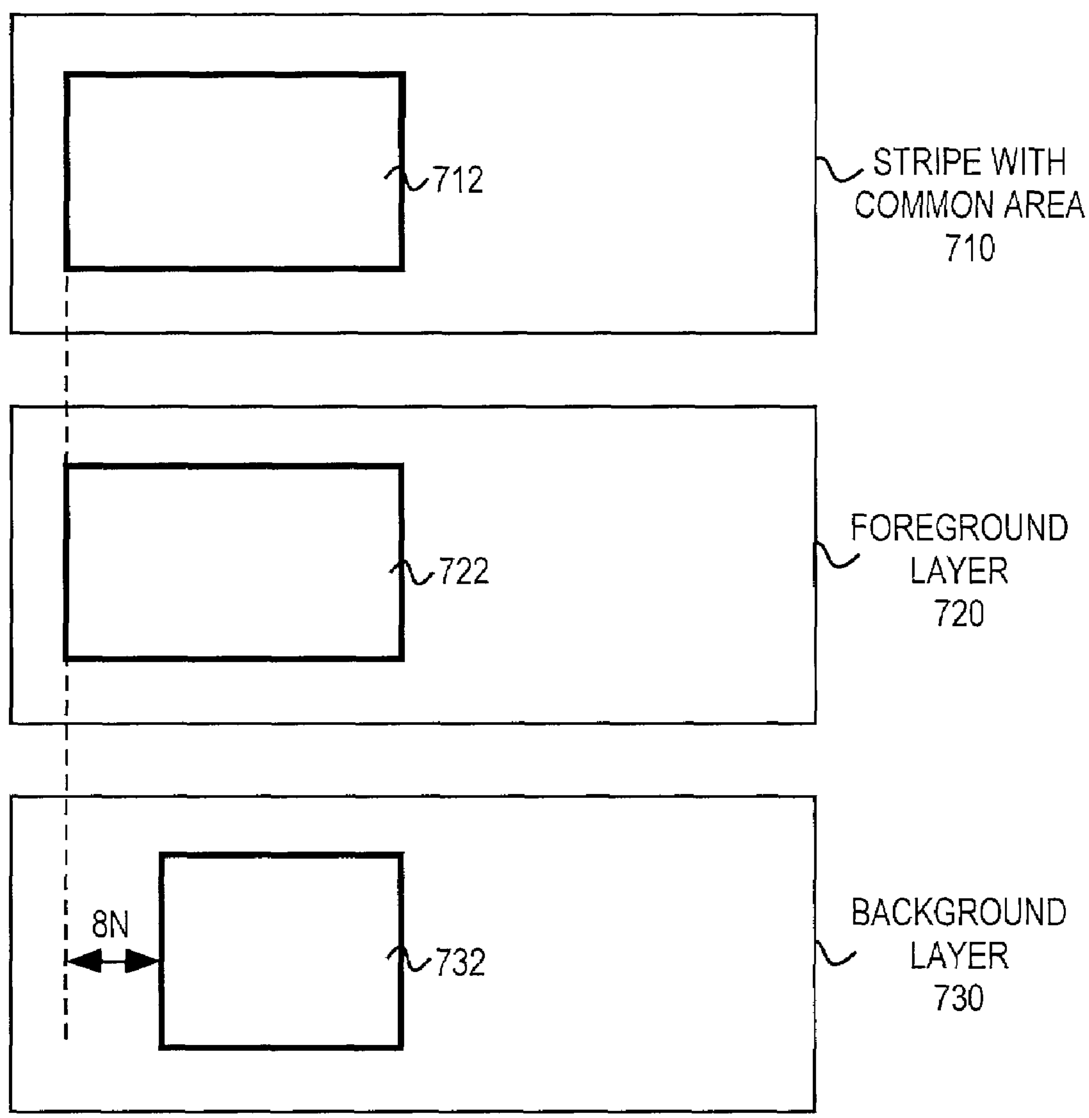
FIG. 7 illustrates a stripe with a common area decomposed into foreground and background layers after common area reduction.

FIG. 7 illustrates a stripe 710 with common area 712 before common area reduction. The stripe is decomposed into foreground layer 720 with reduced common area 722 and background layer 730 with reduced common area 732. The foreground reduced common area is the same as the common area 712 before reduction. The background reduced common area 732, however, is smaller in size indicating that common area reduction was successful for the background layer. Mask values have now been assigned to all areas except the intersection of the foreground and background common reduced areas. In the illustrated example, the intersection of the two is actually the background common area 732.

In one embodiment, the boundary of the reduced common area is adjusted to ensure that it facilitates efficient coder operation. For a JPEG coder, the boundary of the reduced common area is adjusted to ensure that it is 8N pixels from the left edge of the common area 712 before reduction, wherein N is an integer (i.e., 0, 1, 2. . . ). Thus the intersection of the two areas is designed to be a multiple of 8N pixels from the left edge of the area to be coded. In this case, the left edge of the background common reduced area is adjusted to ensure that it is a multiple of 8N pixels from the left edge of the foreground common reduced area.

Figure 8:
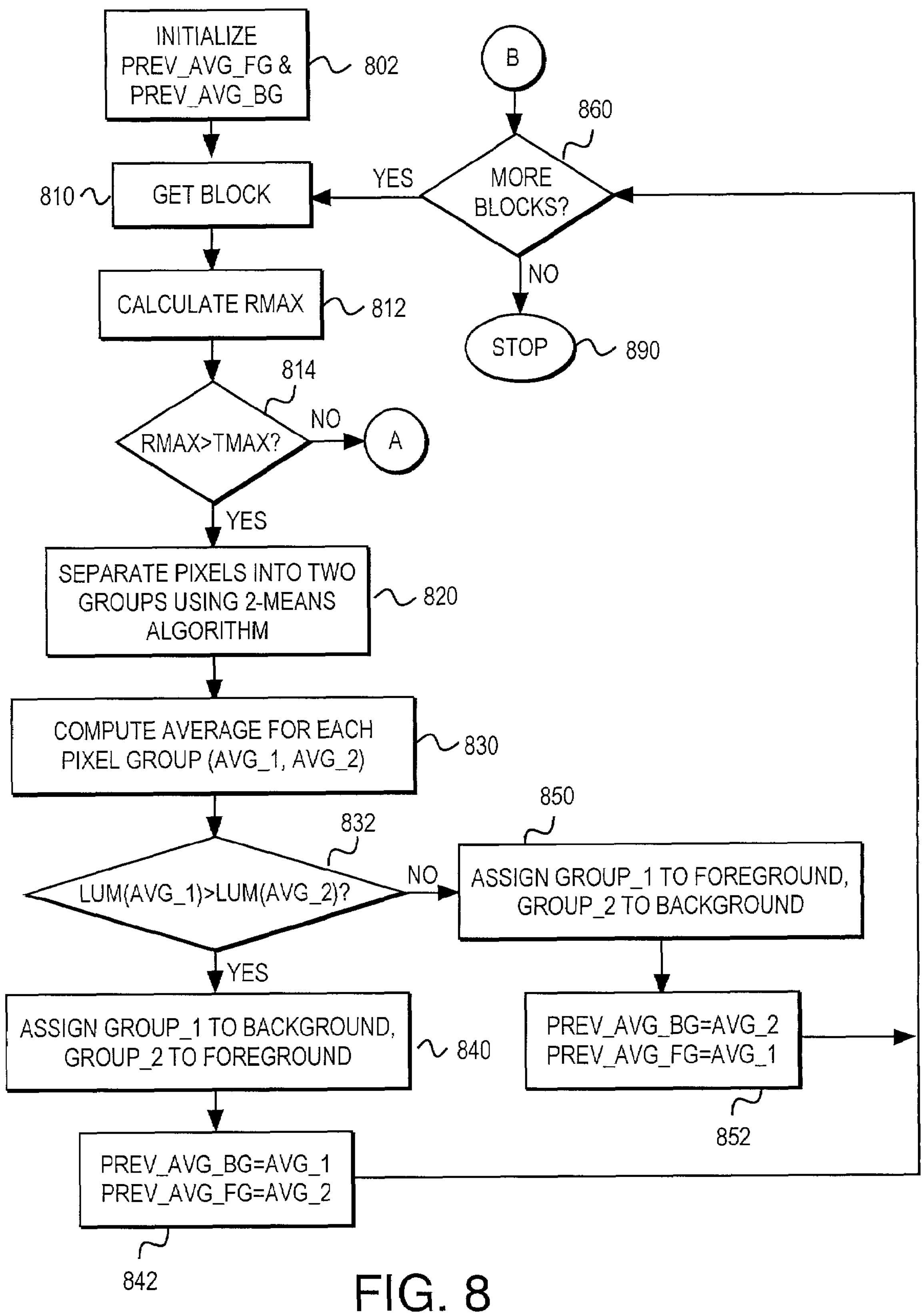
FIGS. 8–9 illustrate the coder matched layer separation process.
Figure 9:
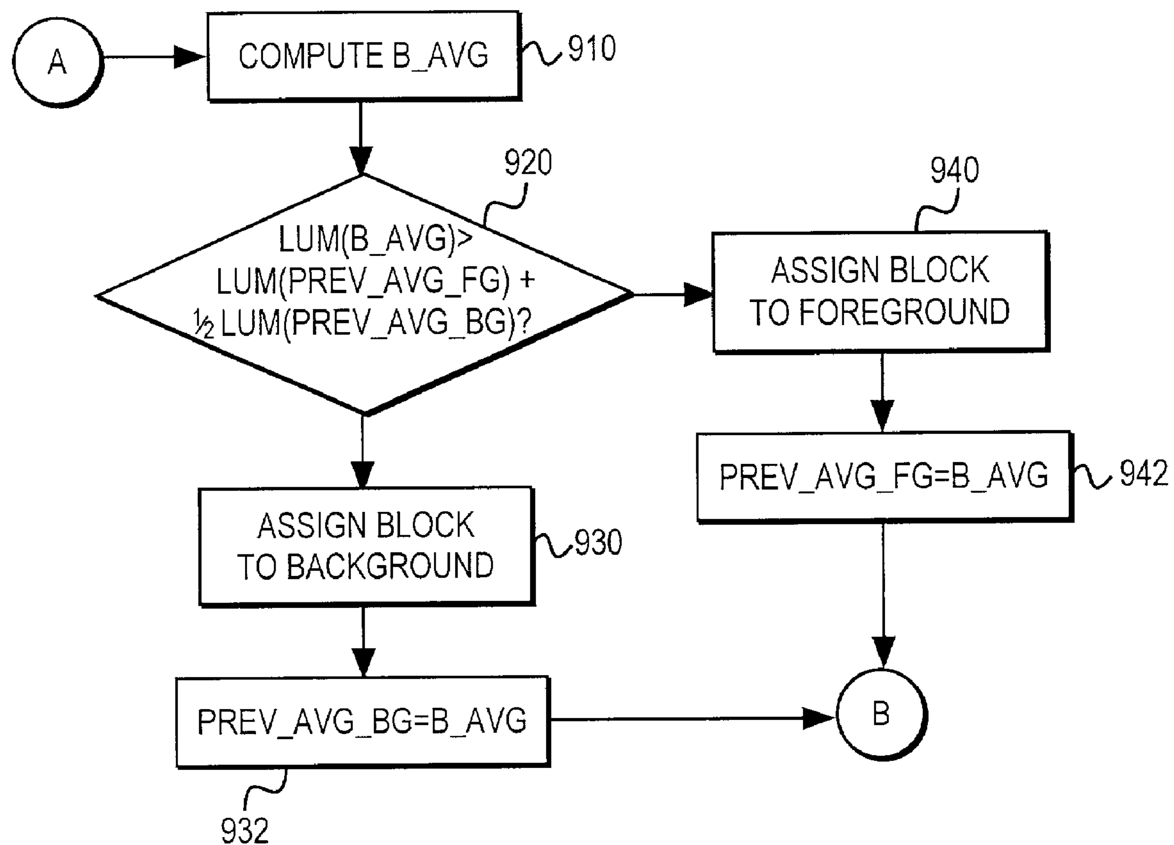

Referring to FIG. 4, after the stripe analysis block 430 has identified the base colors and offsets (step 440), a coder matched layer separation is performed (step 450). FIGS. 8–9 illustrate the coder matched layer separation process. In one embodiment, the coder matched layer separation attempts to decompose the region of intersection into two separate layers that code more efficiently than the area of intersection itself.

Edges inside of JPEG coded blocks yield high coded rates. The coded rate is smaller, however, if the edges are moved to block boundaries. Thus high differentially coded DC values caused by jumps in DC values in successive blocks are more efficiently coded than high AC coefficients caused by edges inside the block.

Generally the coder matched layer separation processes blocks of pixels in the area of intersection in the coder scan order. Thus for JPEG coders, the blocks are processed in row scan order. Within each block there are three possible layer combinations. Each block may consist of 1) pixels that belong exclusively to the foreground layer; 2) pixels that belong exclusively to the background layer; or 3) some pixels belonging to the foreground layer and other pixels belonging to the background layer.

If the block is of sufficiently low variance, it is assigned entirely to the foreground or background layer depending upon whether its pixels are closer to the DC value of the previous coded foreground block or the previous coded background block. For a high contrast block, the pixels are separated into two groups. In one embodiment, the lighter group is always assigned to the background layer while the darker color is assigned to the foreground layer. The mask values are assigned accordingly.

FIGS. 8–9 illustrate the coder matched layer separation process that is applied to the region of intersection or overlapped common reduced areas. Step 802 initializes the DC values for the interpolated foreground and background blocks. (Interpolation is discussed with respect to block 460.) The variables PREV_AVG_FG and PREV_AVG_BG are vectors representing the average values for each color plane of the previous interpolated coded foreground and background blocks, respectively. These vectors are initialized to the appropriate layer base colors in step 802.

In step 810 a block of pixels is selected from the region of intersection. In step 812, the value RMAX is calculated. For an image in RGB color space, RMAX is a scalar value corresponding to the maximum of the ranges of the R, G, and B components found in the selected block. If RMAX is greater than a pre-determined threshold, TMAX, as determined by step 814 (i.e., RMAX>TMAX), then some pixels will be assigned to the foreground and other pixels will be assigned to the background as determined by steps 820–852. Otherwise, if RMAX≦TMAX then the entire block will be assigned to either the background or the foreground layer based on an average luminance value in the block as determined by steps 910–942 of FIG. 9.

If RMAX>TMAX, the pixels are separated into two groups. In one embodiment, a 2 means algorithm is used to separate the pixels into two groups, GROUP__1 and GROUP__2. The average for each group, AVG__1 and AVG__2 is then calculated in step 830. AVG__1 and AVG__2 are vectors whose elements represent the average pixel value of the associated color plane for GROUP__1 and GROUP__2, respectively.

The average luminances for the groups of pixels are compared in step 832. In one embodiment, the darker group is assigned to the foreground and the lighter group is assigned to the background.

Thus, if the average luminance of GROUP__1 is greater than the average luminance of GROUP__2 as determined by step 832, then GROUP__1 is assigned to the background and GROUP__2 is assigned to the foreground in step 840. The components of vector variable PREV_AVG_BG are assigned the average value for the associated color plane for the pixels in GROUP__1 (i.e., PREV_AVG_BG=AVG__1).

Similarly, the components of vector variable PREV_AVG_FG are assigned the average value for the associated color plane of the pixels in GROUP__2 (i.e., PREV_AVG_FG=AVG__2).

Alternatively, if the average luminance of GROUP__1 is not greater than the average luminance of GROUP__2, then GROUP__1 is assigned to the foreground and GROUP__2 is assigned to the background in step 850. The variables PREV_AVG_BG and PREV_AVG_FG are respectively assigned the average value for the pixels in GROUP__2 and GROUP__1 (PREV_AVG_BG=AVG__2 and PREV_AVG_FG=AVG__1).

After the pixels have been assigned to the appropriate layer, step 860 determines if there are any blocks remaining to be processed. If so, the process continues with another block in step 810. Otherwise, the process is completed in step 890.

In the event RMAX≦TMAX, then the block average, B_AVG, is computed in step 910 of FIG. 9 after step 814 of FIG. 8. The elements of vector B_AVG represent the average of each color plane of the image. The average block luminance is computed in step 920. Depending upon whether the average block luminance value is closer to the average luminance of the previous background or the previous foreground, the entire block is assigned to the background or foreground. Thus if the average luminance of the selected block is closer to the average luminance of the previous background, the block is assigned to the background in step 930 and the vector PREV_AVG_BG is set to B_AVG in step 932.

If, however, the average luminance of the selected block is closer to the average luminance of the previous foreground, the block is assigned to the foreground in step 940 and the vector PREV_AVG_FG is set to B_AVG in step 942.

Once the entire block has been assigned to either the foreground or the background layer, step 860 determines whether there are more blocks to process. If so, processing continues with step 810. If not, the process is completed in step 890.

Referring to FIG. 4, after the coder matched layer separation takes place in step 450, the layers are interpolated in step 460. The purpose of layer interpolation is to fill up the "holes" produced in the background and foreground layers when pixels are assigned to the other layer with values that result in efficient encoding. For each image layer 8×8 blocks are scanned in row-column order and interpolated to fill in the holes.

Although the value of these holes are irrelevant to the reconstruction of the image (they are masked out), the value assigned to the corresponding pixels may have significant impact on the block compression rate. Accordingly, the values of these "hole" or "don't care" pixels are modified in order to achieve greater compression efficiencies. This approach will not affect the reproduction quality and does not require modification of the decoding algorithm. The don't care pixels are alternatively referred to as "irrelevant" or "modifiable" pixels. The remaining pixels are referred to as "relevant" or "nonmodifiable" pixels.

As noted previously, each block of the stripe may consist of 1) pixels that belong exclusively to the foreground layer; 2) pixels that belong exclusively to the background layer; or 3) some pixels belonging to the foreground layer and other pixels belonging to the background layer. For a selected image layer, this implies that a block of the selected image layer may consist of 1) relevant pixels exclusively, 2) irrelevant pixels exclusively, or 3) a combination of relevant and irrelevant pixels.

Figure 10:
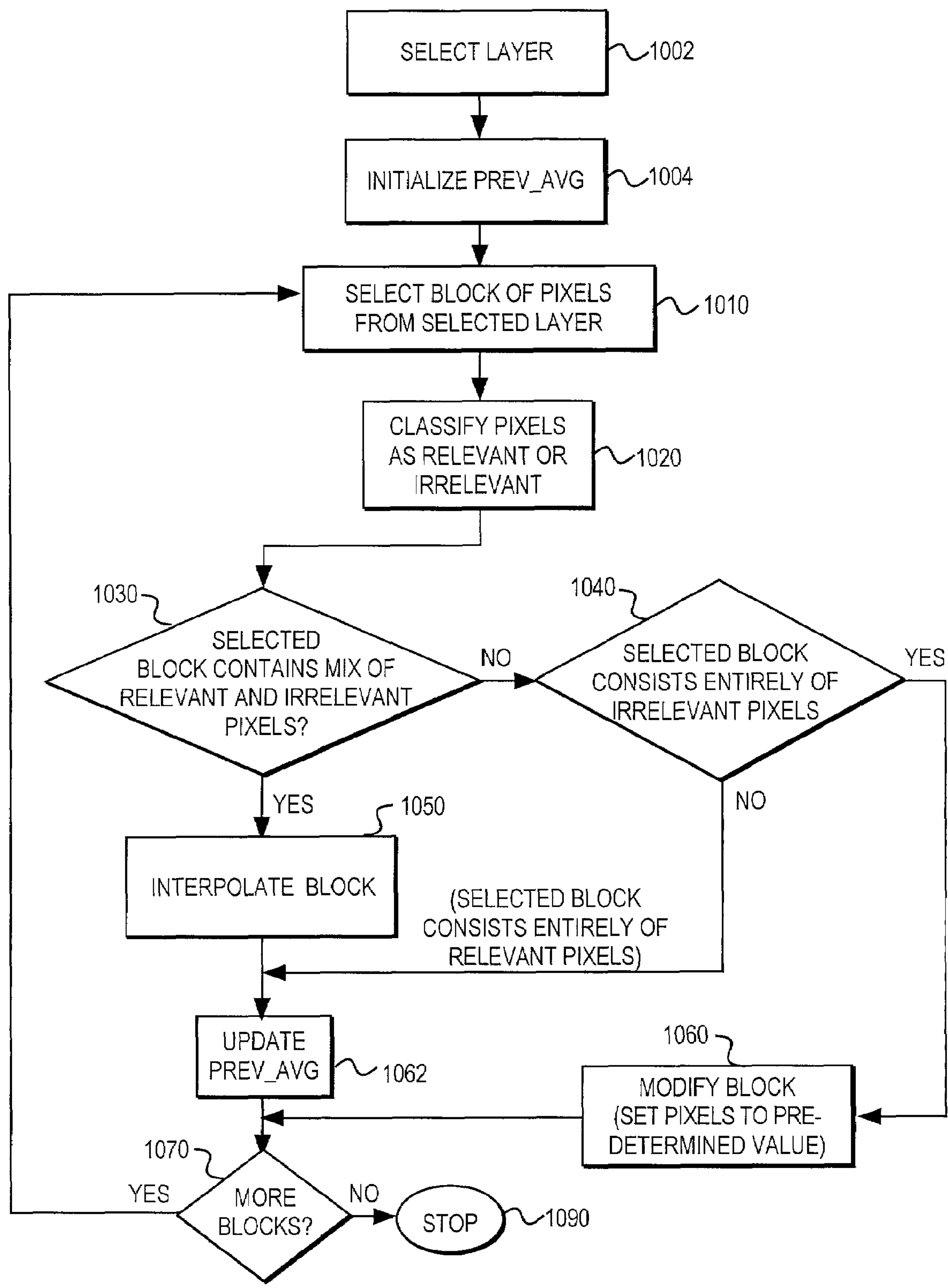
FIG. 10 illustrates the selection of blocks for pixel interpolation or modification.

FIG. 10 illustrates how blocks of a selected image layer of a stripe are selected for interpolation. An image layer is selected in step 1002 from the set {foreground, background}. A variable PREV_AVG is initialized to either the background or foreground base color in step 1004 depending upon the corresponding selected layer. A block of pixels for the selected layer is selected in step 1010. The pixels are classified as relevant or irrelevant in step 1020. The mask layer inherently classifies pixels as relevant or irrelevant for a given image layer.

If the selected block contains a mix of relevant and irrelevant pixels as determined by step 1030, then the block is interpolated as indicated by step 1050. If the selected block consists entirely of irrelevant pixels as determined by step 1040, then the pixel values are set to a pre-determined value in step 1060. In one embodiment, the pre-determined value is PREV_AVG which is initially set to the foreground or background color depending upon the associated layer being processed. If the block otherwise consists entirely of relevant pixels, then no interpolation is performed.

After steps 1050 or 1040, the PREV_AVG is updated with the average values of the relevant pixels in the selected block in step 1062. No update is required if the selected block initially consisted entirely of irrelevant pixels. After PREV_AVG has been updated, if necessary, step 1070 determines if the selected layer has additional blocks to be processed. If so, the process returns to step 1010 to repeat itself with a new block.

In one embodiment the interpolation of step 1050 assigns the irrelevant pixels the average value of the relevant pixels in the selected block. This interpolation procedure tends to be considerably faster than the subsequently discussed interpolation procedure, but may not achieve the same rate of compression.

In an alternative embodiment, the interpolation process of step 1050 is considerably more complex but frequently results in greater compression rate than the simpler and faster averaging process. In order to understand this alternative interpolation process some understanding of the coder process is required.

Block compression algorithms are prevalent in image processing applications. One technique for compressing the digital representation of source image data includes the step of transforming the spatial domain image data into frequency domain data. Transformation from the spatial domain into the frequency domain is also referred to as a forward transformation.

Forward transformation is analogous to a harmonic analysis of the source image. A forward transform is used to represent the spatial image data as linear combinations of basis functions. The coefficients for these basis functions are determined during the transformation process.

The basis coefficients are then quantized or thresholded to eliminate contributions from the corresponding basis function to achieve some level of compression. The remaining coefficients are then re-ordered or run-length encoded or otherwise processed to facilitate further compression of the image data. The resulting compressed image data is then available for storing, distribution, or for further processing.

Typically, the greater the number of zero-valued quantized coefficients, the greater the rate of compression. Accordingly, the values of the irrelevant pixels may be modified to decrease the number of non-zero quantized coefficients. The modifiable pixels are modified so that a quantized forward transform of the modified block has a greater number of zero values than a quantized forward transform of the selected block. This operation reduces the "rate" of the compressed image, where "rate" is a reference to the storage requirements of the compressed image. The operation thus increases the compression efficiency or rate efficiency of the image encoder.

The manner in which pixels are modified depends upon the specifics of the compression algorithm. The Joint Photographic Experts Group and the Motion Picture Experts Group (MPEG) have each promoted popular image compression and encoding architectures that manipulate spectral content to achieve data compression. JPEG compression is frequently used for static images such as those encountered in facsimile or standard printing applications. The MPEG format is used for dynamic images or movies. The basic process has been promulgated by JPEG and is in widespread use today. Although JPEG utilizes a Discrete Cosine Transformation (DCT), specific implementations of the forward transform, quantization, and entropy encoding blocks is left to the implementer.

Figure 11:
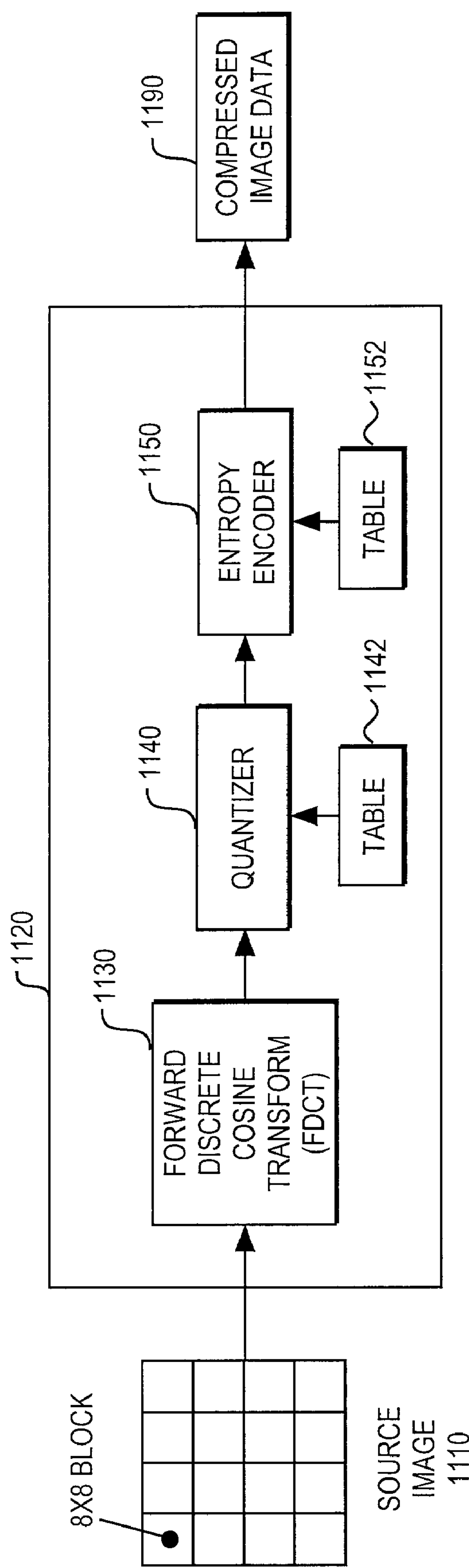
FIG. 11 illustrates one embodiment of a block oriented compression process.

FIG. 11 illustrates one embodiment of a block-based process for compressing an image in greater detail. The image encoder 1120 processes a discretized source image 1110 to produce compressed image data 1190.

Encoder 1120 processes the source image 1110 as a plurality of 8×8 source blocks. A forward transformation is performed on each 8×8 source block. Each 8×8 source block is a 64-point discrete signal that is a two-dimensional spatial function of x and y. The DCT is one of many transforms that can be used to represent signals as linear combinations of basis functions. Although the DCT is the selected transform for JPEG compression, other linear forward transforms such as the Fourier transform and the Discrete Sine Transform (DST) may be used.

The forward DCT is a harmonic analyzer that converts the 64 point discrete signal into 64 orthogonal basis signals. Each orthogonal basis signal represents a two dimensional spatial frequency forming the spectrum of the 8×8 source block. The output of the forward DCT is a coefficient block identifying the amplitude of each of these orthogonal basis signals. The amplitudes are referred to as DCT coefficients and the values are determined by the discrete 64 point input signal.

Referring again to FIG. 11, quantizer 1140 quantizes the DCT coefficients in accordance with a quantization table 342. Different quantums can be used with different spatial frequencies as identified by quantization table 1142. The quantized c(u,v) may be calculated as follows:

$$c^Q(u, v) = INT\left(\frac{c(u, v)}{q(u, v)}\right)$$

where "INT" is an integer function to ensure the result is an integer.

The quantization table permits different step sizes for different basis functions. The quantization table is thus a 64 element table, one element for each spatial frequency. Generally, step sizes for higher frequency basis functions are larger than the step sizes for lower frequency basis functions. The step sizes are typically chosen at the perceptual threshold for the visual contribution of the corresponding cosine basis function. The perceptual threshold are functions of the source image characteristics, display characteristics, viewing distance, etc. Thus the choice of quantization table may be application dependent.

After quantization, entropy encoding is used to efficiently represent the quantized coefficients. Entropy encoder 1150 uses entropy encoding table 1152 to generate the compressed image data 1190.

Briefly, the number of previous zeros and the bits needed to represent the current quantized coefficient value form a pair. Each pair has its own code word assigned through a variable length code. Huffman, Shannon-Fano, and arithmetic coding are examples of commonly used variable length coders. The more often a given element occurs, the smaller the number of bits that are used for the corresponding code. The JPEG encoder outputs the code word for the pair and then a code word for the current quantized coefficient (also assigned by a variable length coder).

After processing a block of quantized DCT coefficients, the JPEG encoder writes a unique end of block sequence and then moves to the next block. After finishing all blocks, the JPEG encoder writes an end-of-file marker. Tables 1152 and 1142 may be incorporated into the compressed image data to facilitate reconstruction.

Figure 12:
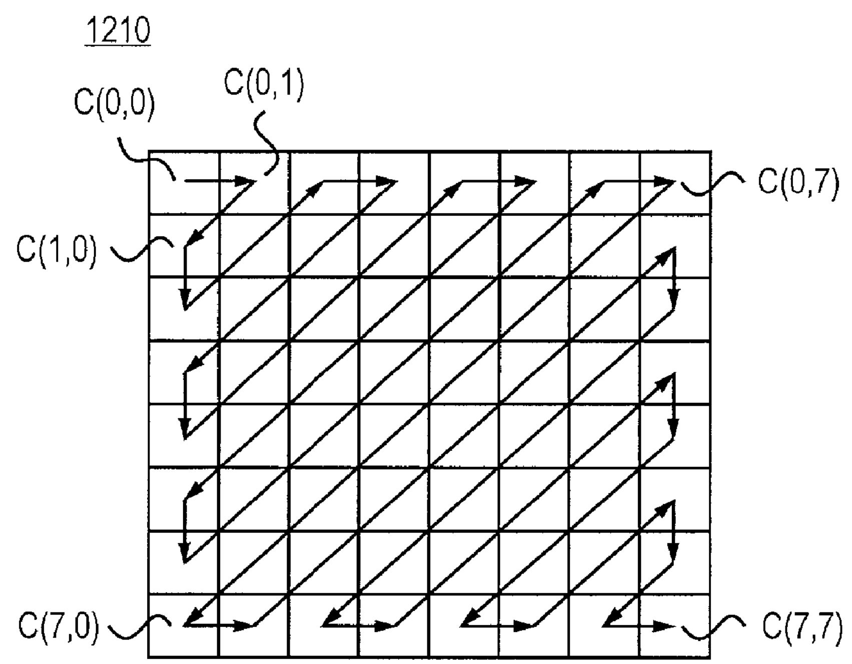
FIG. 12 illustrates a zig-zag processing order for entropy encoding coefficients.

The result of quantization is that many of the DCT coefficients have been reduced to zero. In particular, coefficients corresponding to higher frequency cosine basis functions tend to be zero. Ordering quantized DCT coefficients to obtain longer strings of zero-valued elements improves the rate efficiency of the entropy encoder, particular at the point where any remaining quantized DCT coefficients to be encoded are all zero. Accordingly, the entropy encoder encodes the quantized DCT coefficient block in a zig-zag manner progressing from quantized coefficients associated with lower frequency basis functions to the quantized coefficients associated with higher frequency basis functions as illustrated in FIG. 12.

The upper left corner of block 1210 corresponds to the DC term (u, v=0). The DC terms are differentially encoded across individual encoded blocks. The remaining AC terms represent higher frequency cosine basis functions when progressing towards the lower right corner. The JPEG entropy encoder need only encode up to the highest frequency non-zero quantized coefficient before writing an end of block. Any other coefficients are presumed to be zero.

The zig-zag scan order tends to group the number of non-zero elements at one end of the string of elements to be encoded. When the higher frequency basis coefficients are zero, the zig-zag scan order groups the zero elements at the end of the string of quantized coefficients being coded, thus improving the rate efficiency of the entropy encoder. The JPEG encoder need not encode beyond the last non-zero quantized coefficient in the scan order. Given that the higher order frequencies are likely to be zero, the zig-zag scan order thus increases the compression efficiency of the JPEG encoder.

The basic spectral manipulation encoding process can be modified to permit modification of pixel values that are irrelevant to reconstruction of the source image, but might have significant effects on rate efficiency.

The 64 pixels in a block are denoted as vector $\underline{z}$ which is comprised of two smaller vectors $\underline{y}$ and $\underline{x}$ such that $$\underline{z}^T=\{\underline{y}^T,\underline{x}^T\}$$

where $\underline{y}$ y is the set of $N_y$ relevant pixels and $\underline{x}$ is the set of $64\text{-}N_y$ irrelevant pixels. The 64×64 2D DCT transformation matrix for the vector is denoted T so that the coefficient set $\underline{c}$ is given by $\underline{c}=T\underline{z}$.

One approach might be to solve for the vector $\underline{x}$ in $\underline{z}$ that minimizes the energy of the AC coefficients while leaving the known vector $\underline{y}$ unaffected. The cost function to be minimized is then given by $$\begin{aligned} J(\underline{x}) &= \sum_{i=1}^{63} c_i^2 \\ &= \|\underline{c}\|^2 - c_0^2 \\ &= \|\underline{z}\|^2 - c_0^2 \\ &= \|\underline{x}\|^2 + \|\underline{y}\|^2 - c_0^2 \end{aligned}$$

-continued $$= \sum_{i=0}^{63-N_y} x_i^2 + \|\underline{y}\|^2 - c_0^2$$

The DC coefficient for 2D DCT is given by:

$$\begin{aligned} c_0 &= \frac{1}{8}\sum_{i=0}^{63} z_i \\ &= \frac{1}{8}\sum_{i=0}^{Ny-1} y_i + \frac{1}{8}\sum_{i=0}^{63-Ny} x_i \end{aligned}$$

When $J(\underline{x})$ is partially derived with respect to each element $x_i$ of $\underline{x}$ and equated to zero, ach element is found to yield the same optimal value given by:

$$x_i = \frac{1}{N_y}\sum_{i=0}^{Ny-1} y_i$$

Thus the optimal interpolation for the modifiable pixels in terms of minimizing energy of AC coefficients is the solution that sets the values of all the modifiable pixels to the average of the nonmodifiable pixels. This approach might be a good starting point but it ignores the effects of differential DC coding and the particulars of the block compression algorithm entropy encoder.

The goal is to find $\underline{z}$ that minimizes the rate by maximizing zero runs along the reverse zig-zag scanning path while satisfying other constraints. For example, any modifiable $z_i$ must be assigned a pixel value within the realizable range and $z_i$ for nonmodifiable pixels should not change giving:

$$z_i=y_i \quad i=\{0,1, \ldots, N_y-1\}$$

$$0 \le z_i \le 255 \quad i=\{Ny, \ldots, 63\}$$

Consider the DCT coefficients for the modified block. Some coefficients are quantized to zero while others are quantized to non-zero values. The locations (i.e., indices) of the coefficients that can be quantized to zero form the set $I_{zero}$ such that $$I_{zero} = \left\lfloor i \middle| -\frac{q_i}{2} < c_i < \frac{q_i}{2}; i \in \{0, 1, \ldots, 63\} \right\rfloor$$

The coefficients are scanned in reverse zig-zag scan order to find the first one, $c_j$, that is not quantized to zero. If it is possible to "push" the coefficient to zero without violating the other constraints then there is a solution $\underline{z}$ which satisfies the previous constraints:

$$z_i=y_i \quad i=\{0,1, \ldots, N_y-1\}$$

$$0 \le z_i \le 255 \quad i=\{Ny, \ldots, 63\}$$

as well as the following constraint obtained from the $I_{zero}$ set:

$$-\frac{q_i}{2} < c_i = \underline{t}_i^T z < \frac{q_i}{2},\ i \in I_{zero},$$

(i.e., no zero-quantized coefficient may become non-zero quantized that also satisfies the following constraint:

$$-\frac{q_j}{2} < c_j = \underline{t}_j^T z < \frac{q_j}{2}$$

The term $\underline{t}_i$ represents the $i^{th}$ row of DCT matrix T. Each zero quantization constraint is a linear inequality constraint. The existence of a feasible solution is a Phase 1 linear programming problem which can be readily solved using techniques such as the simplex method. Modification of coefficient values will not affect the value of relevant pixels as a result of the equality constraints limiting such modifications. Relevant pixels in the selected block will have the same value as corresponding pixels in an inverse transform of the modified coefficient block. The inverse transform of the modified coefficient block is a modified selected block.

If a solution exists, then the index of the new zero quantized coefficient is added to the $I_{zero}$ set and $\underline{z}$ is updated to the feasible solution. If, $c_j$ is not zero quantizable, then the method proceeds to the next non-zero coefficient proceeding in the reverse zig zag order. The process may be repeated until all non-zero quantized coefficients have been tested.

Although the resulting solution satisfies all the constraints, the solution may not be optimal in the sense of minimizing the energy of the coefficients. In addition to maximizing the length or number of zero runs, the energy of the non-zero quantized coefficients should be minimized to reach the lowest rate. The minimum energy solution at each stage minimizes:

$$E(z) = \left(c_0 - \frac{8}{Ny}\sum_{i=0}^{N_y-1} y_i\right)^2 + \sum_{i=1}^{63} c_i^2$$

subject to the previously established constraints:

$$-\frac{q_1}{2} < c_i = \underline{t}_i^T z < \frac{q_i}{2},\ i \in I_{zero}$$

$$z_i = y_i\ i = \{0, 1, \ldots, N_y - 1\}$$

$$0 \leqq z_1 \leqq 255\ i = \{Ny, \ldots, 63\}$$

The dc value is considered differentially with respect to the mean of the relevant pixel values. The above problem is a quadratic cost function subject to a series of linear equality and inequality constraints. A quadratic program may be applied to identify a solution. The quadratic solver needs only to be invoked after the successive Phase 1 linear programs.

The successive linear programs yield solutions with increasing numbers of zero quantized coefficients which may result in the energy of the remaining DCT coefficients becoming higher than that of the optimal average interpolated block. If the energy increases too much, the rate may increase even if zero runs have been maximized.

To avoid this outcome, the quadratic program may be invoked at each stage after a feasible solution has been found. In this case, the quadratic program uses a stopping criterion based on the ratio of the coefficient energies of the newest modified block versus that of the average interpolated block. If the energy E of the modified selected block exceeds a pre-determined proportion $T_E$ ($T_E$>1) of the energy $E_0$ of the average interpolated block then the optimization is terminated to avoid leading to a higher rate.

Figure 13:
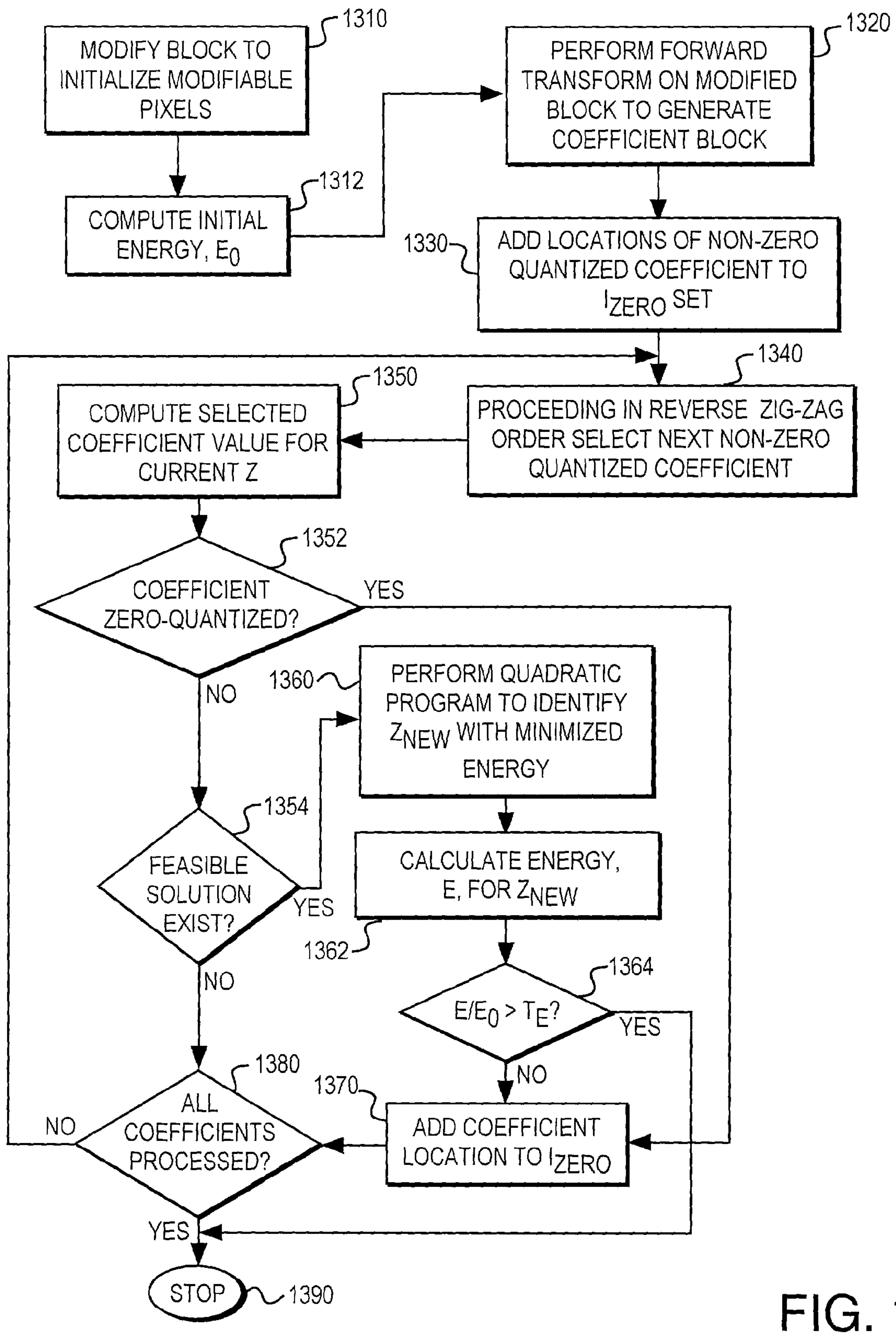
FIG. 13 illustrates a method of modifying the spectral content of a selected block of pixels subject to a plurality of constraints.

FIG. 13 illustrates the pre-compression optimization process for blocks having a mix of relevant and irrelevant pixels. The irrelevant pixels are initialized in step 1310. In one embodiment, the irrelevant pixels are set to a value corresponding to the average pixel value of the relevant pixels in the selected block. In step 1312, the energy of the selected block (after initialization) is computed as $E_0$.

In step 1320, a coefficient block is generated by applying a forward transform on the selected block. In step 1330, the location of all zero quantized coefficients is stored in array $I_{zero}$.

Proceeding in the reverse zig-zag order, the location of a selected non-zero quantized coefficient is identified in step 1340. In step 1350, the value of the selected coefficient is calculated for the current $\underline{z}$.

Step 1352 determines whether the selected coefficient is zero quantized. If so, then the location of the coefficient is appended to the $I_{zero}$ set of other zero quantized coefficients in step 1370.

If the selected coefficient is not zero quantized, then step 1354 determines whether a feasible solution exists that results in a zero quantized coefficient subject to the previously identified constraints. In one embodiment, a Phase 1 linear program is used to identify such a feasible solution. In one embodiment, the simplex method is used to identify feasible solutions. If no feasible solution exists, processing continues to step 1380.

If a feasible solution exists, a quadratic program is used to identify the minimal energy solution for $\underline{z}$ in step 1360. This new z has an associated energy, E, which is calculated in step 1362.

Step 1364 determines whether $$\frac{E}{E_0} > T_E,$$

where $T_E$ is an acceptable threshold value for the proportion of E to $E_0$. If $$\frac{E}{E_0} \leq T_E$$

then the coefficient location is added to the $I_{zero}$ set of other zero quantized coefficients in step 1370 and processing continues with step 1380.

Proceeding from either step 1354 or step 1370, a check is performed in step 1380 to determine whether there are any more coefficients to be processed. If not, then the modification process for the coefficient block is completed in step 1390. Otherwise, the process continues with the next non-zero quantized coefficient by returning to step 1340.

The optimization process repeats steps 1340–1380 until all non-zero quantized coefficients have been processed or until the energy of the result exceeds the pre-determined threshold.

In one embodiment, the process stops the first time a feasible solution cannot be found regardless of whether additional coefficients remain to be processed. This approach maximizes the length of the last run on zeroes. The last run has the most significant effect on coded rate for JPEG encoders due to the principle of operation of the entropy encoder.

The method of spectral content manipulation tends 1) to increase the number of zero quantized coefficients, and 2) to prioritize increasing the number of consecutive zero quantized coefficients associated with higher frequency basis functions. Given the idiosyncrasies of entropy encoders, this enables the JPEG encoder to represent the relevant image using less data before issuing an end of block.

Referring back again to FIG. 4, once the layer interpolation has been performed, the background, foreground, and mask layer coding is performed in step 470. In one embodiment, the foreground and background layers are JPEG coded (see FIG. 11) and the mask layer is JBIG coded.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of decomposing an image comprising:

decomposing the image into a plurality of stripes;

determining a layer base color, a layer size and a layer offset of at least one stripe of the plurality of stripes;

separating the stripe into a foreground layer, a background layer and a mask layer based on the layer base color and the layer offset; and interpolating irrelevant pixel values in the foreground layer and background layer for coder efficiency, wherein said interpolating irrelevant pixel values further comprises:

determining the layer base color and the layer offset to a common reduced area of at least one layer to identify image and mask layer values for all regions except an overlapped common reduced area; and separating the overlapped common reduced area into a foreground layer and a background layer.

2. The method of claim 1 further comprising:

encoding the foreground layer, background layer, and mask layer.

3. The method of claim 2 wherein the foreground layer and background layer are JPEG encoded, wherein the mask layer is JBIG encoded.

4. The method of claim 1 wherein said interpolating irrelevant pixel values further comprises:

classifying at least one pixel within a selected block of a selected layer as relevant or irrelevant;

generating a coefficient block representing a forward transform of the selected block; and modifying coefficient values to generate a modified coefficient block subject to a set of pre-determined constraints including a constraint that the relevant pixels have a same value in an inverse transformation of the modified coefficient block as in the selected block.

5. The method of claim 4 wherein said modifying coefficient values includes:

selecting a coefficient from the coefficient block in a reverse zig-zag order wherein the selected coefficient has a non-zero value; and finding a feasible solution resulting in a zero quantizable selected coefficient subject to the pre-determined constraints.

6. The method of claim 4 wherein the coefficient values are modified subject to a constraint that no zero quantizable coefficient preceding the selected coefficient in the reverse zig-zag order is permitted to become non-zero quantizable.

7. The method of claim 4 wherein values of individual elements of a mask classify pixels in corresponding positions within the selected block as relevant or irrelevant.

8. The method of claim 4 further comprising:

providing the modified coefficient block to a block compression process.

9. The method of claim 4 wherein said interpolating irrelevant pixel values further comprises applying a linear program to identify a feasible solution resulting in a zero-quantizable coefficient subject to the constraints.

10. The method of claim 9 further comprising applying a quadratic program to generate a modified selected block having minimal energy.

11. The method of claim 9 further comprising terminating further modifications to the coefficient block if a ratio of the energy of the modified block to the energy of the initial selected block exceeds a pre-determined threshold.

12. The method of claim 4 wherein the forward transform is one of a discrete cosine, a discrete sine, and a discrete Fourier transform.

13. A method of decomposing an image comprising:

decomposing the image into a plurality of stripes;

decomposing at least one stripe into foreground and background image layers, and a mask layer;

identifying an area of intersection of a common reduced foreground area and a common reduced background areas, wherein the identifying further comprises:

computing a maximum block range for a selected block of the area of intersection; and assigning at least one pixel within the selected block to one of the foreground and background planes in accordance with whether the average luminance of the selected block is closer to a previous average foreground luminance or previous average background luminance, respectively, if the maximum block range is not greater than a pre-determined threshold; and interpolating any irrelevant pixel values within the area of intersection for coder efficiency for at least one layer.

14. The method of claim 13, wherein the area of intersection is selected to have an edge that is 8N pixels from at least one of an edge of the common reduced foreground area and the common reduced background area, wherein N is an integer, wherein $N \geqq 0$.

15. The method of claim 13, wherein said interpolating any irrelevant pixel values further comprises:

selecting a block of pixels; and classifying at least one pixel with the selected block as irrelevant or relevant.

16. The method of claim 15, wherein said interpolating any irrelevant pixel values further comprises:

calculating an average value of at least one relevant pixel within the selected block; and assigning the average value to at least one irrelevant pixels within the selected block.

17. The method of claim 13, wherein said identifying an area of intersection further comprises:

computing a maximum block range for a selected block of the area of intersection;

dividing pixels within the selected block into a plurality of groups; and assigning at least one selected group to one of the foreground and background planes in accordance with a relative average luminance value of the selected group and another group, if the maximum block range exceeds a pre-determined threshold.

18. The method of claim 17, wherein said assigning at least one selected group further comprises assigning the selected group to the background layer and the other group to the foreground layer if an average luminance of the selected group is greater than an average luminance of the other group, wherein the selected group is assigned to the foreground layer and the other group to the background layer if the average luminance of the selected group is not greater than the average luminance of the other group.

* * * * *

UNITED STATES PATENT AND TRADEMARK OFFICE

CERTIFICATE OF CORRECTION

PATENT NO. : 7,027,647 B2
APPLICATION NO. : 10/036979
DATED : April 11, 2006
INVENTOR(S) : Debargha Mukherjee et al.

It is certified that error appears in the above-identified patent and that said Letters Patent is hereby corrected as shown below:

In column 12, line 20, delete "ach" and insert -- each --, therefor.

In column 13, line 50, delete "-q1/2" and insert -- -qi/2 --, therefor.

In column 13, line 54, delete "zl=yl" and insert -- zi=yi --, therefor.

In column 13, line 55, delete "0<=zl" and insert -- 0<=zi --, therefor.

In column 16, line 14, in Claim 8, after "comprising" delete ":".

Signed and Sealed this

Nineteenth Day of January, 2010

David J. Kappos

*Director of the United States Patent and Trademark Office*